(12) United States Patent
Meiner

(10) Patent No.: US 11,148,695 B2
(45) Date of Patent: Oct. 19, 2021

(54) DEVICE FOR POSITIONALLY ACCURATE POSITIONING OF A TRANSPORT PALLET

(71) Applicant: Deutsche Post AG, Bonn (DE)

(72) Inventor: Hendrik Meiner, Leipzig (DE)

(73) Assignee: DEUTSCHE POST AG, Bonn (DE)

( * ) Notice: Subject to any disclaimer, the term of this patent is extended or adjusted under 35 U.S.C. 154(b) by 0 days.

(21) Appl. No.: 16/704,050

(22) Filed: Dec. 5, 2019

(65) Prior Publication Data

US 2021/0094598 A1 Apr. 1, 2021

(30) Foreign Application Priority Data

Oct. 1, 2019 (DE) .................... 10 2019 126 427.8

(51) Int. Cl.
*B62B 3/02* (2006.01)
*B62B 3/06* (2006.01)
*B65D 19/42* (2006.01)

(52) U.S. Cl.
CPC .......... *B62B 3/0625* (2013.01); *B62B 3/0606* (2013.01); *B65D 19/42* (2013.01); *B62B 3/02* (2013.01); *B65D 2519/00781* (2013.01)

(58) Field of Classification Search
CPC ....... B62B 3/0625; B62B 3/0606; B62B 3/02; B62B 1/14; B62B 1/142; B62B 1/268; B65D 19/42; B65D 2519/00781; B65D 19/38; B66F 11/00
USPC ............... 280/43.12; 254/2 R, 4 R, 134, 294
See application file for complete search history.

(56) References Cited

U.S. PATENT DOCUMENTS

| | | | | |
|---|---|---|---|---|
| 990,187 A | * | 4/1911 | Bergsather | B62B 1/142 414/452 |
| 1,255,070 A | * | 1/1918 | Waller | B62B 1/142 414/450 |
| 1,598,229 A | * | 8/1926 | Wilcox | B62B 1/14 414/452 |
| 3,628,467 A | * | 12/1971 | Stout | B60P 7/0815 410/55 |
| 4,685,854 A | * | 8/1987 | Bulle | B62B 1/12 280/47.24 |
| 5,249,908 A | * | 10/1993 | Tsai | B62B 3/0606 280/46 |
| 5,405,235 A | * | 4/1995 | Lebre | B62B 3/104 280/47.24 |
| 8,424,886 B2 | * | 4/2013 | Mozo | B62B 5/067 280/47.371 |

(Continued)

FOREIGN PATENT DOCUMENTS

DE 19820942 A1 3/1999
EP 1852328 A2 11/2007

OTHER PUBLICATIONS

German Office Action (w/ English translation) for corresponding German Application No. DE 10 2019 126 427.8, dated Aug. 13, 2020—12 pages.

*Primary Examiner* — John D Walters
*Assistant Examiner* — Hilary L Johns
(74) *Attorney, Agent, or Firm* — Dority & Manning, P.A.

(57) ABSTRACT

A device (1) for the accurate positioning of a transport pallet (2) includes a coupling unit (3, 4) for coupling to the transport pallet (2), a handle element (6) which is arranged on the coupling unit (3, 4) for the handling of the device (1) by an operator, and a locking unit (7, 8) for locking the coupling unit (3, 4) non-rotatably to the transport pallet (2) in a fixed position.

10 Claims, 6 Drawing Sheets

(56) References Cited

U.S. PATENT DOCUMENTS

| | | | |
|---|---|---|---|
| 2005/0129491 A1* | 6/2005 | Smith | B62B 1/264 |
| | | | 414/490 |
| 2008/0107511 A1* | 5/2008 | Oberg | B62B 1/268 |
| | | | 414/445 |
| 2011/0049823 A1* | 3/2011 | Coats | B65F 1/1468 |
| | | | 280/47.3 |
| 2015/0225215 A1* | 8/2015 | King | B62B 3/0625 |
| | | | 254/8 R |
| 2017/0291658 A1* | 10/2017 | Somerset | B62B 3/007 |
| 2018/0022155 A1* | 1/2018 | Davis | B62B 5/0089 |
| | | | 414/469 |

* cited by examiner

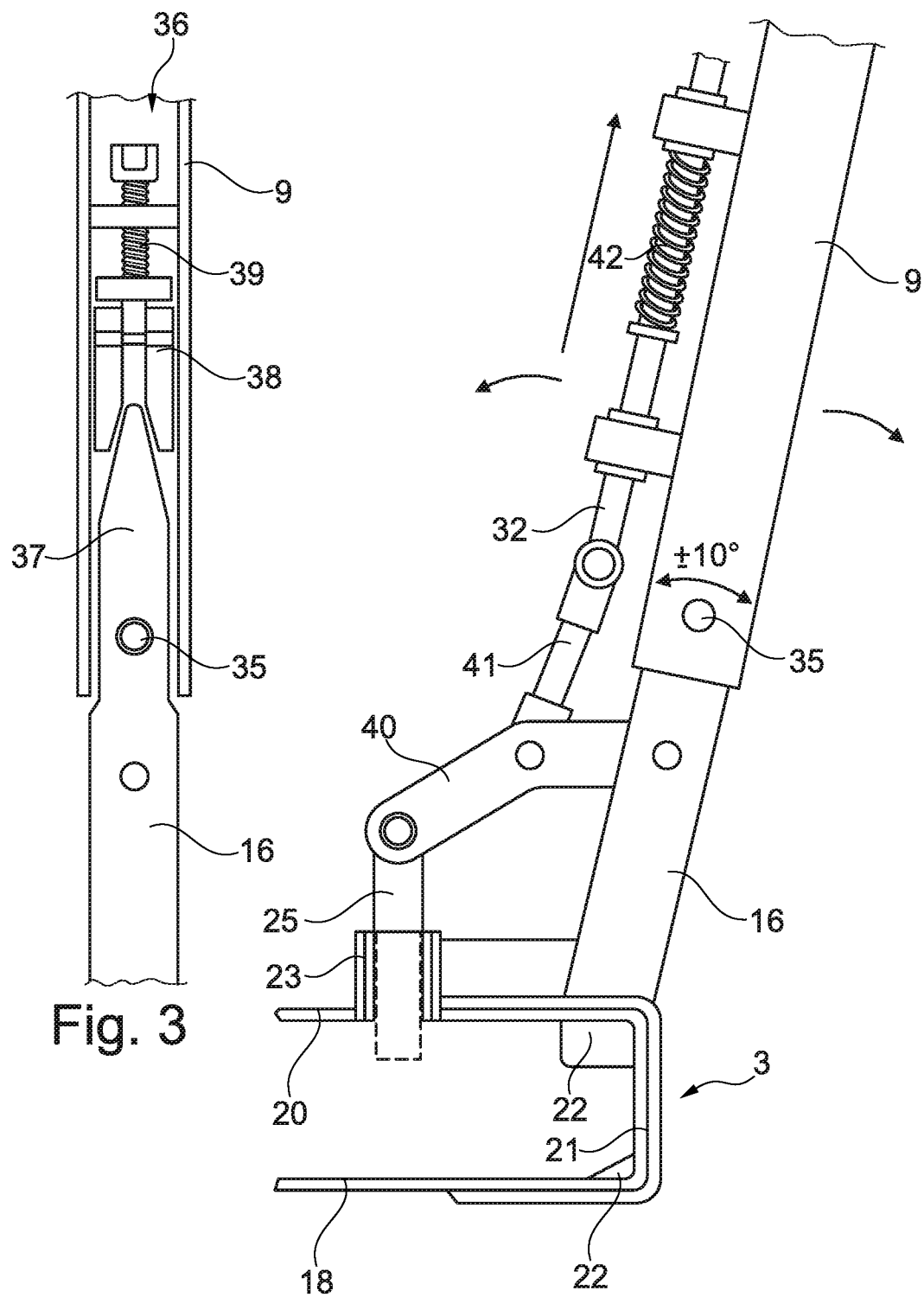

DEVICE FOR POSITIONALLY ACCURATE POSITIONING OF A TRANSPORT PALLET

CROSS-REFERENCE TO RELATED APPLICATION

The present application is related and has right of priority to German Patent Application No. 10 2019 126 427.8 filed on Oct. 1, 2019, which is incorporated by reference in its entirety for all purposes.

FIELD OF THE INVENTION

The invention relates generally to a device for the accurate positioning of a transport pallet, in particular of an air-freight pallet, on a subsurface, along which the transport pallet is able to slide, for example a castor deck.

BACKGROUND

A series of devices and methods are disclosed in the prior art in order to position transport pallets on even subsurfaces or on castor decks in warehouses, ships, aircraft or vehicles.

A known solution to this end consists in the utilization of a tension belt or tension hook which is mounted on edge strips of air-freight pallets by means of so-called double mushroom eyelets. To bring about a certain degree of occupational safety, care must be taken, in this case, to ensure that the two free ends of the tension belt are spaced apart from one another and are mounted centrally on the pallet so that the operator is able to position the pallet, albeit in a strictly limited manner, as a result of the V-shape of the tension belt which is brought about in this way. It is disadvantageous, moreover, for the pallet to be able to be positioned substantially only in the pulling direction, that is to say toward the operator. Positioning as a result of rotation about a vertical pivot axis is only possible in a limited manner and positioning as a result of pushing in a direction away from the operator is not possible. As a result, an operator cannot slow down a pallet moving toward him so that disadvantageously there is a high risk of crushing.

DE 198 20 942 A1 discloses a flatbed trolley with a removable pulling device, a positive locking plug-in connection, which ensures the pulling device has a high level of mobility, being provided between the pulling device and the flatbed trolley. As a result, multiple flatbed trolleys can be moved with one single pulling device.

EP 1 852 328 A2 discloses a rolling pallet for transporting and stacking products which are situated thereon. The rolling pallet consists of a cuboid and plate-shaped hollow body, the side walls of which are constructed from four elongated profile strips which are rectangular in cross section. A cover plate is fastened on the top sides of the profile strips and a base plate is fastened on the bottom sides. An opening is introduced in a side wall. Three running rollers, which project downward through bottom openings in the base plate and which are all aligned by way of their running surfaces with a driving plane which is roughly parallel to the base plate, are fastened on the bottom side of the cover plate in the interior.

SUMMARY OF THE INVENTION

Proceeding from the above, example aspects of the present invention provide a device for the accurate positioning of a transport pallet, in particular of an air-freight pallet, by way of which controlled positioning of the pallet is possible in all horizontal directions of movement, in particular with linear movements and rotational movements. In addition, the device is to provide improved operability and occupational safety compared to existing solutions.

Accordingly, example aspects of the present invention provide a device for the accurate positioning of a transport pallet, in particular of an air-cargo pallet, including a coupling unit for coupling to the transport pallet, a handle element which is arranged on the coupling unit for the handling of the device by an operator and a locking unit for locking the coupling unit non-rotatably to the transport pallet in a fixed position.

The device according to example aspects of the invention realizes a tool for an operator, by way of which he is able to move, align and position a transport pallet, in particular an air-freight pallet, in a manner that is positionally accurate and specific to the angle of rotation with little effort and a high degree of precision, in particular on a so-called caster deck. In this case, it is possible to position the pallet in an arbitrary horizontal direction. As a result of locking the coupling unit non-rotatably to the transport pallet in a fixed position, the operator, with full control, is advantageously able to pull the pallet toward himself, push the pallet away from himself, move the pallet to both sides, to the left and to the right, and rotate the pallet in both directions about a horizontal pivot axis. As the relative position of pallet and operator is able to be controlled in a very simple and effective manner by the latter, the device according to example aspects of the invention brings about a particularly high degree of occupational safety, which is particularly important in particular in view of the sometimes high weights moved but equally in the case of empty pallets or, for example, pallets loaded with a weight of up to 100 kg.

According to an example embodiment of the invention, the handle element includes a rotatable joint which includes a rotational axis which is arranged in the horizontal direction. As an alternative or in addition, the handle element is arranged on the coupling unit by the rotatable joint. It is ensured in the above-described manner that the handle element is rotatable relative to the coupling unit about an axis which is horizontal when the device is used as intended. The handle element is preferably pivotable within an angular range of at least one hundred and eighty degrees (180°) in such a manner that, with the coupling unit in engagement with the pallet, said handle element can come to rest on the bottom or the pallet in both directions of rotation and in this way a torque, which acts transversely with respect to the edge of the pallet, can be reliably prevented from being transmitted by the handle element and the coupling unit onto the edge of the pallet and consequently damaging the same. The invention also includes example embodiments, however, with a smaller pivot angle range, for example of approximately ninety degrees (90°) or +/− ten degrees (10°) or five degrees (+/−5°). The risk of damage to the pallet is small even in the case of a pivot angle within a range of approximately one hundred and ten degrees (110°). By providing such a rotatable joint, movement sequences arising with the device during the handling of the pallet can be designed in a very flexible manner. The rotatable joint can be realized, in particular, so as to be scalable or adjustable so that the pivot angle range made possible for the handle element by said pivot joint is able to be adjusted specifically depending on the present requirements. For example, the pivot angle can be determined by stops on the rotatable joint. The stops allow for a locking element, which is described further below, to be able to ensure the locking at certain pivot angles in the direction of the operator. The maximum pivot angle with respect to the operator can be, for example, forty-two degrees (42°) or forty-nine degrees (49°).

A particularly high degree of safety against crush injuries of operators can be brought about according to a further example embodiment by the pivot angle of the abovementioned rotatable joints of the handle element being realized in such a manner that the bottom side of the handle element on the side located opposite the coupling element is always spaced from the ground by a distance of approximately nineteen centimeters (19 cm)+/− one centimeter (1 cm). In this way, in particular, crushing injuries of the foot of the operator are almost reliably excluded. The handle element is to be pivotable in the direction of the pallet in such a manner that its upper end projects into the surface area of the pallet by between approximately forty centimeters (40 cm) and fifty centimeters (50 cm). In this way, the handle element and consequently almost the entire device can be "parked" inside the pallet without parts of the device protruding substantially from the pallet into the space surrounding the pallet and device and providing a source of danger for passing persons or vehicles. In addition, providing the rotatable joint prevents the bracket being utilized in order to raise the edge of the pallet located opposite the bracket or to push the pallet by the bracket when the bracket is in the uppermost position.

A further example embodiment of the invention is characterized in that the handle element includes a substantially U-shaped bracket with two free ends or arms. In this case, a coupling unit is arranged on each of the two free ends/arms. Such a design of the handle element is particularly user-friendly in an advantageous manner because rotational movements of the pallet can be carried out in both directions in a very simple manner not using much effort. In addition, such a bracket provides sufficient space for two hands to be used, which once again means a reduced workload. A further advantage is that the pallet is contacted by two coupling elements which are spaced apart from one another so that forces and torques transmitted via one single coupling element are small so that damage to the pallet and to the edge strip thereof are able to be reliably avoided.

According to a further example embodiment, the coupling unit includes a substantially U-shaped jaw. Said jaw is realized and determined for gripping around the edge of the transport pallet. It has a lower free arm which is realized and determined for gripping underneath the edge of the pallet, an upper free arm which is realized and determined for gripping above the edge of the pallet, and a center piece which connects the two arms to one another and is realized and determined for bearing against the edge and in particular for transmitting shear forces from the device to the pallet. The distance between the two free arms is preferably slightly greater than the thickness at the edge of the pallet, in such a manner that both a simple arrangement of the coupling device on the edge of the pallet and a sufficiently sturdy seat are ensured.

It is particularly advantageous when the locking unit includes a locking element which is positionable relative to the coupling unit. Said locking element interacts with the pallet in a manner fixing and securing the coupling element thereon, in particular by being realized for engagement in a seat track strip of the transport pallet. The locking element can interact in a positive locking and/or non-positive locking manner with the pallet according to the invention. The locking element prevents the coupling device being unintentionally released from the pallet while it is being handled by the device according to example aspects of the invention. In addition, the locking element can bring about a positive locking and/or non-positive locking closure between the coupling unit, in particular the jaw, and the pallet so that the locking element makes a substantial contribution to the positionability of the pallet in all horizontal directions. The locking element ensures in a reliable manner that the coupling device does not become released unintentionally from the pallet, which, in turn, contributes to an improvement in occupational safety compared to the prior art.

A particularly elegant and sturdy example embodiment provides that the locking element extends through at least one free arm of the U-shaped jaw. In addition, the locking element is also able to engage in the oppositely situated free arm of the jaw or also extend through the same. A fixed and secure seat on the pallet and good force and torque transmission are ensured in this way.

According to a particularly reliable and user-friendly example embodiment of the invention, the locking element is prestressed or biased into a locked position in which the jaw is locked to the transport pallet. Said prestressing can be effected by arbitrary prestressing means; a particular sturdy and favorable solution provides that the prestressing is generated by a mechanical compression spring or tension spring.

According to a further example embodiment, the device additionally includes a triggering device which is actuatable by an operator for unlocking the locking unit. The triggering device can include, for example, a pivot lever mechanism which is operatively connected to the locking element. As an alternative or in addition, the triggering device can include a tension bracket, which is arranged close to the handle element, for manual actuation. A particularly ergonomic embodiment provides that the triggering device is operable by foot so that unlocking can be effected in a particularly rapid and simple manner without an operator having to release the handle element or to stoop down. In this way, once again the safety of the operator is improved as he is always and continuously able to control and, where applicable, correct the location and position of the pallet when the device is connected thereto.

A further example embodiment of the invention provides that the device includes a damping element. Said damping element connects the coupling unit to the handle element in a damping manner so that impacts and vibrations which arise during handling of the pallet and are transmitted to the device are advantageously not transmitted to the operator and in particular not to the hand joints thereof. In addition, loads which act in the reverse direction from the handle element to the pallet are damped, which reduces loads on and damage to the pallet. The damping element can be present, in particular, in the form of a rubber damper or silent block/bushing. If the device include a rotatable joint which is arranged and acts between the coupling device and the handle element, the damping element can be integrated in the rotatable joint according to a particularly compact embodiment of the device. The damping element can be adjustable in an advantageous manner.

The device can be constructed of or with of a suitable steel material or else of cast iron as a welded construction.

The handle element can be realized, in particular, in a hollow manner or from tubular elements. Components such as the unlocking device and/or the damping element can then be advantageously arranged in the handle element shielded from negative environmental influences and the operator.

In addition, use is conceivable where the device is not used for manual intervention by way of an operating handle but rather the power pressure is exerted by a hydraulic system of a mechanical device. Said system is connected to a pulling machine of the hydraulic system and, with an arrangement of multiple coupling elements connected side by side, even fully loaded air-freight pallets can be moved on a castor deck or similar under the full control of the operator. In addition, further use is conceivable where the device is not used for manual intervention by way of an operating handle but rather the power pressure is exerted by a hydraulic system of a mechanical device. Said system is connected to a pulling machine of the hydraulic system and, with an arrangement of multiple coupling elements connected side by side, even fully loaded air-freight pallets can be moved on a castor deck or similar under full control.

BRIEF DESCRIPTION OF THE DRAWINGS

Example aspects of the invention are described in more detail below by way of preferred exemplary embodiments with reference to the accompanying drawings, in which:

FIG. 3 shows a sectional view of a view of a detail of a further exemplary embodiment, FIG. 4 shows a side view of a view of a detail of the further exemplary embodiment in FIG. 3.

DETAILED DESCRIPTION

The exemplary embodiments described are simply examples which can be modified and/or supplemented in diverse ways within the framework of the claims. Each feature which has been described for a certain exemplary embodiment can be utilized independently or in combination with other features in an arbitrary other exemplary embodiment. Each feature which has been described for an exemplary embodiment of a certain category can also be used in a corresponding manner in an exemplary embodiment of another category.

Figures 1A, 1B:
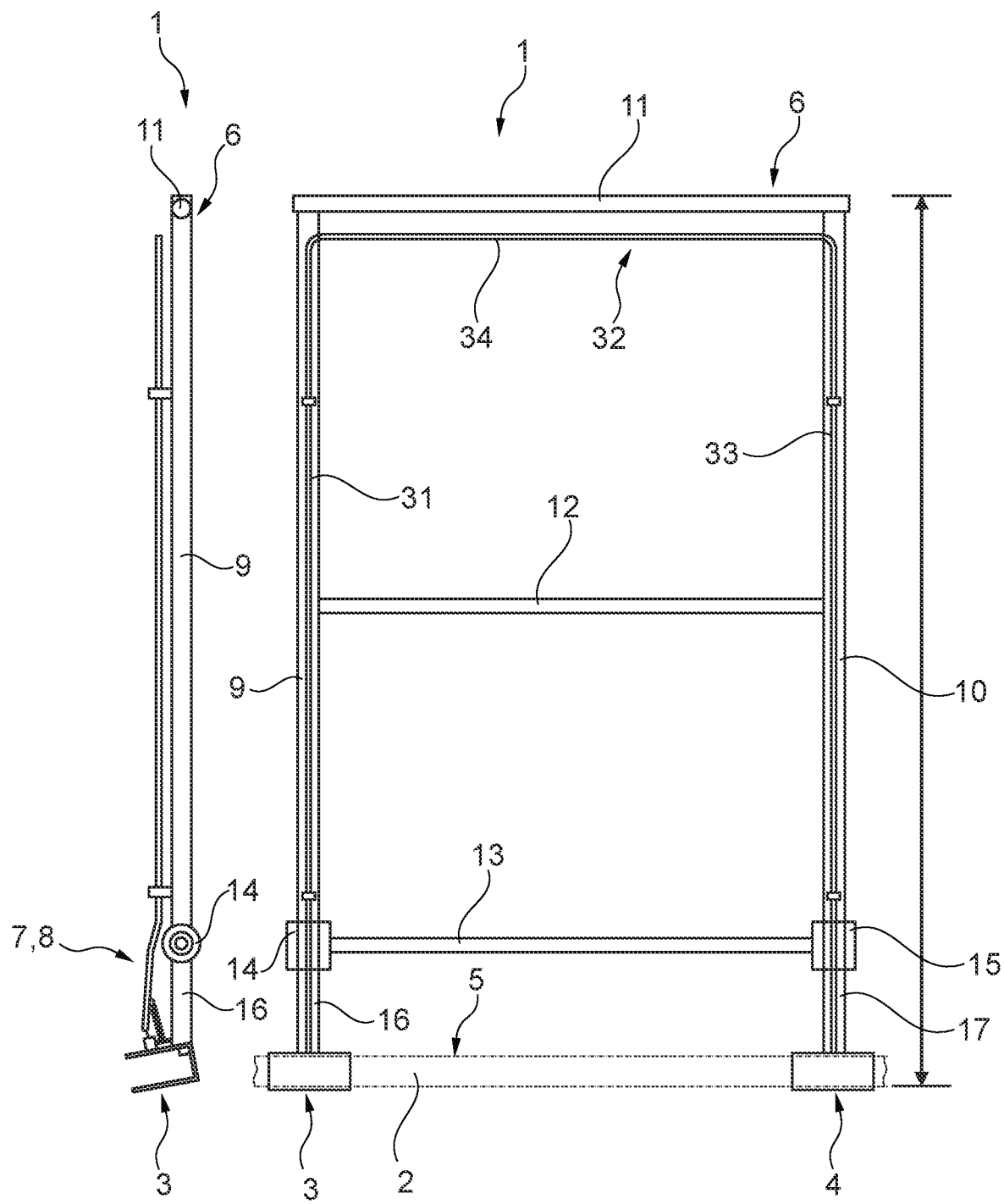
FIGS. 1A and 1B show two schematic views from different directions of sight of a first exemplary embodiment of the invention, with FIG. 1A being a side view and FIG. 1B being a front view.

FIG. 1 shows a first exemplary embodiment of a device 1 for the accurate positioning of a transport pallet 2, which is realized here in the form of an air-freight pallet 2. The device 1 includes a first coupling unit 3 and a second, structurally identical coupling unit 4 for coupling to an edge strip 5 of the transport pallet 2. The edge strip 5 is realized in particular as a so-called seat track strip 5. The pallet 2 additionally includes a handle element 6 which is arranged on the coupling units 3 and 4 for the handling of the device 1 by an operator who is not shown. Finally, the device 1 has a first locking unit 7 and a second locking unit 8, each for locking the corresponding coupling unit 3 or 4 non-rotatably to the edge strip 5 of the transport pallet 2 in a fixed position. As the first coupling unit 3 and the second coupling unit 4 are structurally identical, only the first coupling unit 3 is described below, which description, however, applies in the same way to the coupling unit 4.

The handle element 6 is realized as a substantially U-shaped bracket 6 with a first free handle element arm 9, an oppositely situated second free handle element arm 10 and a handle portion 11 which connects the two handle element arms 9 and 10 together. The two handle element arms 9 and 10 are connected together in a stabilizing manner by a central transverse strut 12 and a transverse strut 13 at the end.

It can clearly be seen in particular in the side view in FIG. 1 that a rotatable joint 14 is arranged in the handle element arm 9 and a structurally identical rotatable joint 15 is arranged in the handle element arm 10. The rotatable joint 14 connects the handle element arm 9 to a lower arm portion 16, whilst the rotatable joint 15 connects the handle element arm 10 to a lower arm portion 17. As shown in the front view in FIG. 1, the arm portion 16 is connected fixedly, here welded, to the coupling unit 3. In addition, the arm portion 17 is connected fixedly, here welded, to the coupling unit 4. The two rotatable joints 14 and 15 are each damped by way of a damping element which cannot be seen in the figures and is the form of a silent block. They have a pivot angle range within a range of approximately one hundred and ten degrees (110°).

Figure 2:
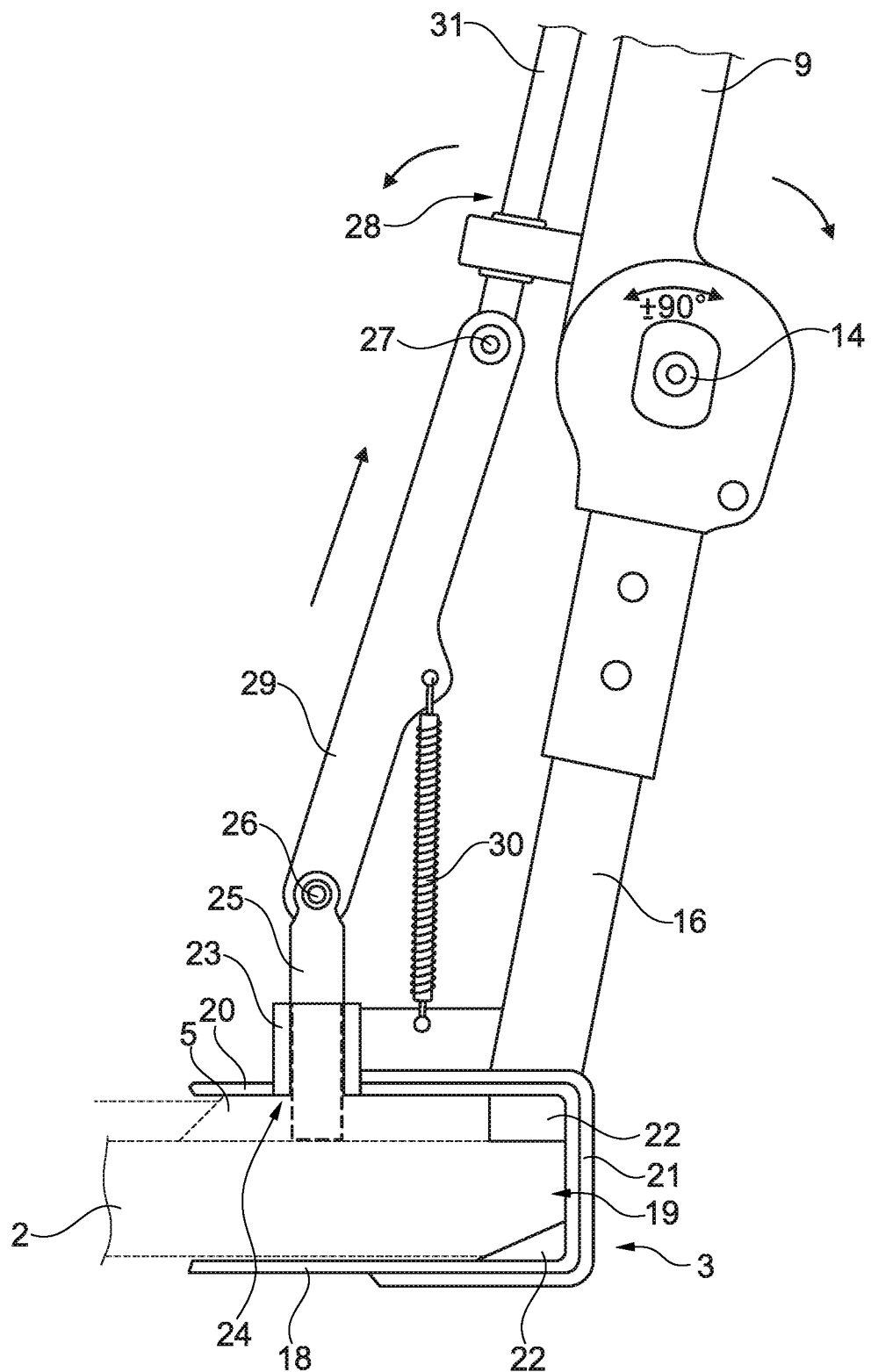
FIG. 2 shows a side view of a view of a detail in the example in FIG. 1.

Details of the coupling unit 3 are shown in FIG. 2. The coupling unit 3 is realized in the form of a substantially U-shaped jaw 3. The U-shaped jaw 3 is realized for gripping around the edge of the transport pallet 2 and has a lower free arm 18, which is realized for gripping underneath the edge 19 of the pallet 2, an upper free arm 20 which is realized for gripping above the edge 19 of the pallet 2 and a center piece 21 which connects the two arms 18 and 20 together and is realized for bearing against the edge of the pallet 2 and consequently for the transmission of shear forces from the device 1 to the pallet 2. The distance between the two free arms 18 and 20 is preferably slightly greater than the thickness of the edge of the pallet 2 in such a manner that both simple arrangement of the coupling unit 3 on the edge 19 of the pallet and a sufficiently sturdy seat are ensured. Reinforcements 22 are realized between the arms 18 and 20 and the center piece 21.

An opening 24, which is surrounded by a guide sleeve 23 and in which a locking element 25 of the locking unit 7 is received so as to be positionable transversely to the pallet plane, is realized in the upper arm 20. The locking element 25 is accordingly positionable relatively to the coupling unit 3, 4 and is realized for engaging in the edge strip 5 or seat track strip 5 of the transport pallet 2. The locking unit 7 additionally includes a coupling lever 29 which is arranged, at the one end, on the locking element 25 so as to be pivotable about a pivot 26 and, at the other end, on a triggering device 28 so as to be pivotable about a pivot 27. Said coupling lever is prestressed or urged by a prestressing element 30, here in the form of a tension spring 30, into a locked position of the locking unit 7 in which the jaw 3 is locked to the transport pallet 2.

The coupling lever 29 is connected pivotably to a free arm 31 of a U-shaped operating handle 32. Said operating handle includes, along with the arm 31, an arm 33 which is parallel thereto and is connected at the end to the coupling lever 29 of the coupling device 4. The two arms 31 and 33 are connected together via a handle central piece 34. As a result of the afore-described geometry, the handle element 6 can be pivoted about the two rotatable joints 14 and 15 without such a pivot movement bringing about a release of the locking units 7 or 8. Said locking units can only be unlocked by user actuation in opposition to the tension of the spring 30 by the locking elements 25 being raised as a result of the operating handle 32 being pulled up, which acts via the respective coupling lever 29 on the corresponding locking elements 25.

FIGS. 3 and 4 show views of details of a further exemplary embodiment of the device 1. This is similar in many parts to the afore-described exemplary embodiment in FIGS. 1 and 2 so that reference is made to said description and only differences will be described below. In place of the pivot joints 14 and 15, pivot joints 35 with a clearly smaller pivot angle range of approximately five degrees (+/−5°) in both directions are realized between the handle element arms 9, 10 and the respective arm portion 16, 17. The handle element arm 9, 10 is tubular and a damping unit 36, which is shown in FIG. 3, is realized in an interior of the handle element arms 9, 10.

The arm portion 16, 17 projects by way of a truncated cone-shaped journal 37 beyond the pivot joint 35 into the handle element arm 9, 10. Said journal 37 engages by way of its distal end in a rubber sleeve 38 as damping element 38 which is produced from a rubber material with a Shore hardness within a range of between forty-five (45) and fifty-three (53). The rubber sleeve 38 is positionable in the direction of the journal 37 by a screw 39 which is arranged in a fixed position on the handle element arm 9, 10, as a result of which the hardness of the damping brought about is able to be adjusted. A further difference is that a coupling lever 40, which is arranged at the one end on the arm portion 16, 17 so as to be rotatable and at the other end on the locking element 25 so as to be rotatable, is provided in place of the coupling lever 29. A connection lever 41, which is connected in a pivotable manner to the operating handle 32, is integrally molded to said coupling lever approximately centrally. The operating handle 32 is prestressed into the locked position by a compression spring 42.

Figure 5:
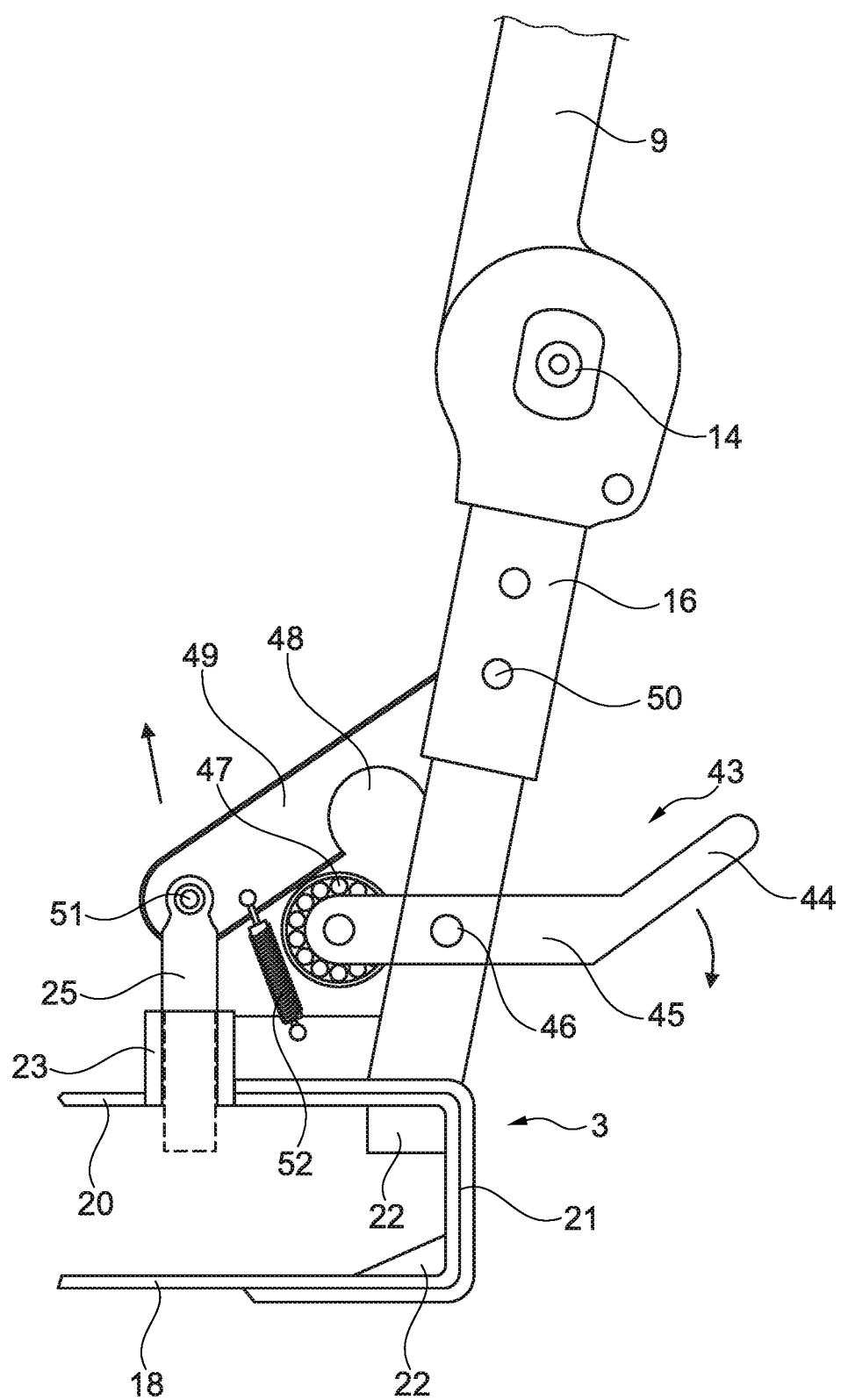
FIG. 5 shows a side view of a view of a detail of the further exemplary embodiment.

The exemplary embodiment in FIG. 5 differs from the exemplary embodiment in FIGS. 1 and 2 in that the embodiment of FIG. 5 includes a triggering device 43 in place of the triggering device 28 with the operating handle 32 which is to be operated manually. Said triggering device includes an operating lever 45 which is provided with a footrest 44 and is integrally molded on the arm portion 16 with a rotatable joint 46. At an end situated opposite the footrest 44, the lever 45 is provided with a roller 47 which can be moved to bear against a coupling arm 49 and can engage in a recess 48 of the coupling arm 49.

The coupling arm 49 is connected at one end by way of a joint 50 to the arm portion 16 and at the other end by way of a joint 51 to the locking element 25 and is prestressed into the locked position by a tension spring 52. In order to move the locking unit 7 out of the locked position into the open position, the operator has to tread downward on the footrest 44, as a result of which the coupling lever 45 rotates about the rotatable joint 46 and moves the roller 47 to bear against the coupling arm 49. By actuating the footrest 44 further, the coupling arm 49 is pivoted and raised about the joint 50 and, at the same time, takes the locking element 25 out of the locked position into the open position. The coupling arm 49 is able to be held in the open position as a result of latching the roller 47 in the recess 48.

Figure 6:
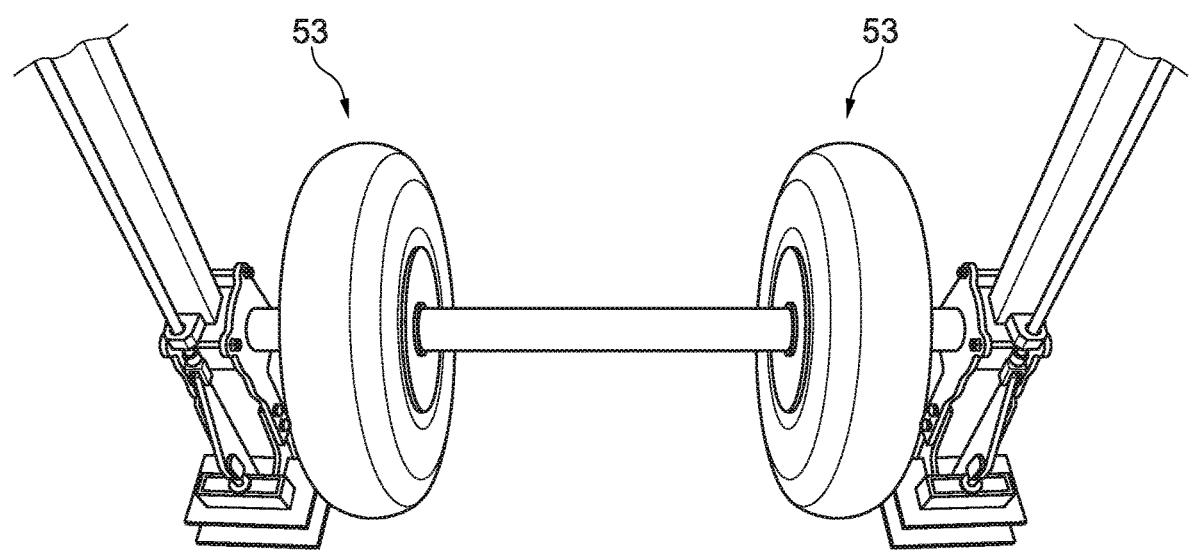
FIG. 6 shows a view of a detail of the example in FIG. 1 as a further exemplary embodiment with transport wheels.
Figure 7:
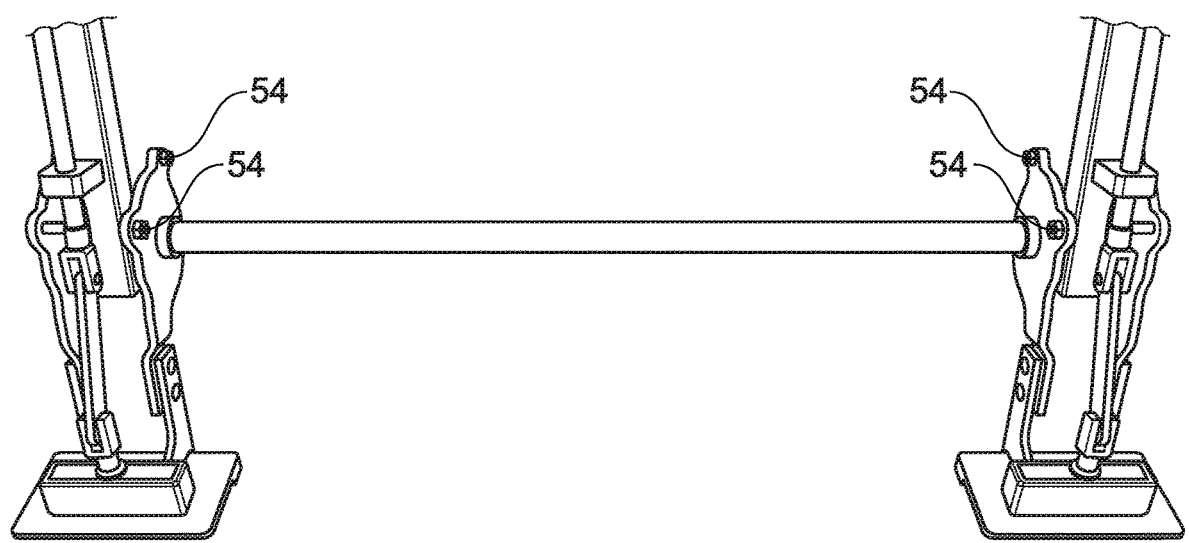
FIG. 7 shows a view of a detail of the example in FIG. 1 as a further exemplary embodiment with stops on a rotatable joint.

Finally, FIG. 6 shows a further exemplary embodiment of the device 1 with transport wheels 53 which are mounted on the lower transverse strut 13 between the handle element arms 9, 10. The transport wheels 53 could also be mounted on the lower transverse strut 13 outside the handle element arms 9, 10. FIG. 7 shows a further exemplary embodiment of the device 1 with stops 54 on the rotatable joint 14 in order to lock the coupling 45.

The exemplary embodiments described are purely examples which can be modified and/or supplemented in numerous ways within the framework of the claims. Each feature which has been described for a certain exemplary embodiment can be utilized independently or in combination with other features in an arbitrary other exemplary embodiment. Each feature which has been described for an exemplary embodiment of a certain category can also be used in a corresponding manner in an exemplary embodiment of another category. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

LIST OF REFERENCES

Device 1
Transport pallet, air-freight pallet 2
Coupling unit 3
Coupling unit 4
Edge strip 5
Handle element 6
Locking unit 7
Locking unit 8
Handle element arm 9
Handle element arm 10
Handle portion 11
Transverse strut 12
Transverse strut 13
Rotating joint 14
Rotating joint 15
Arm portion 16
Arm portion 17
Arm 18
Edge 19
Arm 20
Center piece 21
Reinforcements 22
Guide sleeve 23
Opening 24
Locking element 25
Pivot 26
Pivot 27
Triggering device 28
Coupling lever 29
Prestressing element, tension spring 30
Arm 31
Operating handle 32
Arm 33
Handle center piece 34
Pivot joint 35
Damping unit 36
Journal 37
Rubber sleeve, damping element 38
Screw 39
Coupling lever 40
Connecting lever 41
Compression spring 42
Triggering device 43
Footrest 44

Actuating lever 45
Rotatable joint 46
Roller 47
Recess 48
Coupling arm 49
Rotatable joint 50
Rotatable joint 51
Tension spring 52
Transport wheels 53
Stop 54

The invention claimed is:

1. A device (1) for accurate positioning of a transport pallet (2), comprising:
   a coupling unit (3, 4) configured for coupling to the transport pallet (2);
   a handle element (6) arranged on the coupling unit (3, 4), the handle element (6) configured for handling by an operator of the device (1); and
   a locking unit (7, 8) operable to lock the coupling unit (3, 4) non-rotatably to the transport pallet (2) in a fixed position,
   wherein the locking unit (7, 8) comprises a locking element (25) which is positionable relative to the coupling unit (3, 4) and is configured for engagement in an edge strip (5) or a seat track strip (5) of the transport pallet (2).

2. The device (1) of claim 1, wherein the handle element (6) comprises a rotatable joint (14, 15, 35), and wherein:
   the rotatable joint (14, 15, 35) has a rotational axis that is arranged in a horizontal direction; or
   the handle element (6) is arranged on the coupling unit (3, 4) by the rotatable joint (14, 15, 35) such that the handle element (6) is rotatable relative to the coupling unit (3, 4) about an axis which is horizontal when the device (1) is in use; or
   both the rotatable joint (14, 15, 35) has the rotational axis that is arranged in the horizontal direction and the handle element (6) is arranged on the coupling unit (3, 4) by the rotatable joint (14, 15, 35) such that the handle element (6) is rotatable relative to the coupling unit (3, 4) about the axis which is horizontal when the device (1) is in use.

3. The device (1) of claim 1, wherein the handle element (6) comprises a substantially U-shaped bracket (6) with two free arms (9, 10) and a respective coupling unit (3, 4) is arranged on each of the two free arms (9, 10).

4. The device (1) of claim 1, wherein the coupling unit (3, 4) comprises a substantially U-shaped jaw (3, 4), for gripping around an edge of the transport pallet (2).

5. The device (1) of claim 1, wherein the locking element (25) extends through at least one free end or one free arm (18, 20) of the U-shaped jaw (3, 4).

6. The device (1) of claim 5, wherein the locking element (25) is urged towards a locked position by a compression spring (42) or a tension spring (30, 52), the locking element (25) configured to lock the U-shaped jaw (3, 4) to the transport pallet (2) in the locked position.

7. The device (1) of claim 1, further comprising a triggering device (28, 43) actuatable by an operator to unlock the locking unit (7, 8).

8. The device (1) of claim 7, wherein:
   the triggering device (28, 43) comprises a pivoting lever assembly (43, 44, 45, 46, 47, 48, 49) which is operatively connected to the locking element (25) and is operable by foot; or
   the triggering device (28, 43) comprises a tension bracket (32) arranged proximate the handle element (6) and is actuatable manually with the handle element (6); or
   the triggering device (28, 43) comprises both the pivoting lever assembly (43, 44, 45, 46, 47, 48, 49) which is operatively connected to the locking element (25) and is operable by foot and the tension bracket (32) arranged proximate the handle element (6) and actuatable manually with the handle element (6).

9. The device (1) of claim 1, further comprising a damping element (38) which connects the coupling unit (3, 4) to the handle element (6) in a damping manner, wherein the damping element (38) is an elastic damper or silent block.

10. The device (1) of claim 9, wherein the handle element (6) comprises a rotatable joint (14, 15, 35), and the damping element (38) is integrated in the rotatable joint (14, 15).

* * * * *